United States Patent
Lin et al.

(10) Patent No.: US 10,470,033 B2
(45) Date of Patent: Nov. 5, 2019

(54) METHOD FOR ACQUIRING USER CONFIGURATION INFORMATION AND TERMINAL

(71) Applicant: Nanchang Coolpad Intelligent Technology Company Limited, Nanchang, Jiangxi (CN)

(72) Inventors: Yuyuan Lin, Guangdong (CN); Lingxin Liu, Guangdong (CN)

(73) Assignee: Nanchang Coolpad Intelligent Technology Company Limited, Nanchang (CN)

( * ) Notice: Subject to any disclaimer, the term of this patent is extended or adjusted under 35 U.S.C. 154(b) by 0 days.

(21) Appl. No.: 16/387,097

(22) Filed: Apr. 17, 2019

(65) Prior Publication Data

US 2019/0246264 A1     Aug. 8, 2019

Related U.S. Application Data

(60) Division of application No. 15/634,710, filed on Jun. 27, 2017, now Pat. No. 10,321,302, which is a
(Continued)

(30) Foreign Application Priority Data

Jan. 7, 2015     (CN) .......................... 2015 1 0008047

(51) Int. Cl.
*H04W 8/18*     (2009.01)

(52) U.S. Cl.
CPC .................................. *H04W 8/183* (2013.01)

(58) Field of Classification Search
CPC ...................................................... H04W 8/183
(Continued)

(56) References Cited

U.S. PATENT DOCUMENTS

| 8,090,810 B1* | 1/2012 | Insley ................. G06F 11/3051 |
| | | 709/223 |
| 2002/0023181 A1 | 2/2002 | Brown et al. |
| 2008/0163246 A1 | 7/2008 | Jogand-Coulomb et al. |

FOREIGN PATENT DOCUMENTS

| CN | 101583125 A | 11/2009 |
| CN | 102455915 A | 5/2012 |

(Continued)

*Primary Examiner* — Eugene Yun
(74) *Attorney, Agent, or Firm* — Young Basile Hanlon & MacFarlane, P.C.

(57) ABSTRACT

A method for acquiring user configuration information is provided. The method includes the following. A configuration file is stored as a server configuration file of a current service card in response to receiving the configuration file from a communications server, or configuration information is stored as a user configuration file of the current service card in response to the configuration information being set based on the configuration file, where at least one of the server configuration file of the current service card and the user configuration file of the current service card exists. When the current service card of a terminal is replaced with a replacement service card, prestored user configuration files is searched to find a user configuration file corresponding to the replacement service card, and user configuration information is acquired to perform a communications service according to the user configuration file corresponding to the replacement service card.

15 Claims, 3 Drawing Sheets

Related U.S. Application Data continuation-in-part of application No. PCT/CN2015/077905, filed on Apr. 30, 2015.

(58) Field of Classification Search
USPC .......................................................... 455/558
See application file for complete search history.

(56) References Cited

FOREIGN PATENT DOCUMENTS

| | | |
|---|---|---|
| CN | 102724657 A | 10/2012 |
| CN | 103813295 A | 5/2014 |
| CN | 104243202 A | 12/2014 |

* cited by examiner

METHOD FOR ACQUIRING USER CONFIGURATION INFORMATION AND TERMINAL

CROSS-REFERENCE TO RELATED APPLICATION(S)

This application is a divisional application of U.S. patent application Ser. No. 15/634,710, filed on Jun. 27, 2017, which is a continuation-in-part of international Patent Application PCT No. PCT/CN2015/077905, filed on Apr. 30, 2015, which claims priority to Chinese Patent Application No. 201510008047.7, filed on Jan. 7, 2015, contents of which are hereby incorporated by reference in their entireties.

TECHNICAL FIELD

The present disclosure relates to the communications field, and in particular, to a method for acquiring user configuration information and a terminal.

BACKGROUND

In a process in which a terminal uses a communications service, a communications system may download, according to a service card of the terminal, configuration information corresponding to the communications service, where the service card is, for example, a subscriber identification module (SIM) card, a universal subscriber identity module (USIM) card, or a removable user identity module (R-UIM) card. A user may set the configuration information as required, for example, set whether to use some functions of the service. However, when the service card of the terminal is changed, the configuration information corresponding to the service card cannot be automatically loaded. This results in a problem that the information corresponding to the service needs to be reset when the user uses the service card again next time. In the prior art, a problem that the user needs to reset configuration information when the user changes a service card cannot be avoided.

SUMMARY

The present disclosure provides a method for acquiring user configuration information and a related terminal, which are used to resolve a problem of the prior art that a user needs to reset configuration information after a service card of a terminal is replaced.

According to a first aspect of the present disclosure, a method for acquiring user configuration information is provided. The method includes the following. A configuration file is stored as a server configuration file of a current service card in response to receiving the configuration file from a communications server, or configuration information is stored as a user configuration file of the current service card in response to the configuration information being set based on the configuration file, where at least one of the server configuration file of the current service card and the user configuration file of the current service card exists. When the current service card of a terminal is replaced with a replacement service card, prestored user configuration files is searched to find a user configuration file corresponding to the replacement service card, and user configuration information is acquired to perform a communications service according to the user configuration file corresponding to the replacement service card.

The user configuration file of the current service card includes user configuration information of different wireless network access points that correspond to an international mobile subscriber identification (IMSI) number.

Furthermore, the method further includes: when the user configuration file corresponding to the replacement service card is not found in the user configuration file of the current service card, generating a server configuration file of the replacement service card according to a preset server configuration file template, and generating a user configuration file of the replacement service card according to a preset user configuration file template.

The user configuration file template is displayed as a general configuration user interface on a terminal interface.

The user configuration file is an extended markup language (XML) file named by using the IMSI number of the current service card of the terminal and a user identity, and the server configuration file is an XML file named by using the IMSI number of the current service card of the terminal and a server identity.

According to another aspect of the present disclosure, a terminal is provided. The terminal may include a memory configured to store computer-readable program codes, and a processor configured to invoke the computer-readable program codes to perform following operations: storing a configuration file delivered by a communications server as a server configuration file of a current service card, or storing configuration information set by a user based on the configuration file as a user configuration file of the current service card when the communications server delivers the configuration file, or when the user performs setting based on the configuration file delivered by the communications server, at least one server configuration file of the current service card or at least one user configuration file of the current service card being included; and searching the user configuration file of the current service card to find a user configuration file corresponding to a replacement service card when the current service card of the terminal is replaced, and acquiring user configuration information according to the user configuration file corresponding to the replacement service card.

The user configuration file of the current service card includes user configuration information of different wireless network access points that correspond to an IMSI number.

Furthermore, the processor may further be configured to invoke the computer-program codes to perform following operations: generating a server configuration file of the replacement service card according to a preset server configuration file template, and generating a user configuration file of the replacement service card according to a preset user configuration file template when the user configuration file corresponding to the replacement service card is not found in the user configuration file of the current service card.

The user configuration file template is displayed as a general configuration user interface on a terminal interface.

The user configuration file is an XML file named by using the IMSI number of the current service card of the terminal and a user identity, and the server configuration file is an XML file named by using the IMSI number of the current service card of the terminal and a server identity.

According to yet another aspect of the present disclosure, a machine-readable storage medium is further provided. The storage medium may include computer readable program codes. The computer readable program codes are run in a terminal to execute the method for acquiring user configuration information described above.

According to the technical solution of the present disclosure, the configuration information generated by setting the configuration file delivered by the communications server is stored in the user configuration file of the current service card. When the configuration information needs to be used after a service card is replaced, configuration information corresponding to a replacement service card is acquired from multiple user configuration files. In comparison with the prior art, the user does not need to reset configuration information after a service card is replaced, facilitating user operations.

DETAILED DESCRIPTION

The following further describes the present disclosure in detail with reference to the accompanying drawings and implementations. It should be understood that the specific implementations described herein are merely used for describing the present disclosure, but are not intended to limit the present disclosure.

Implementation 1

Figure 1:
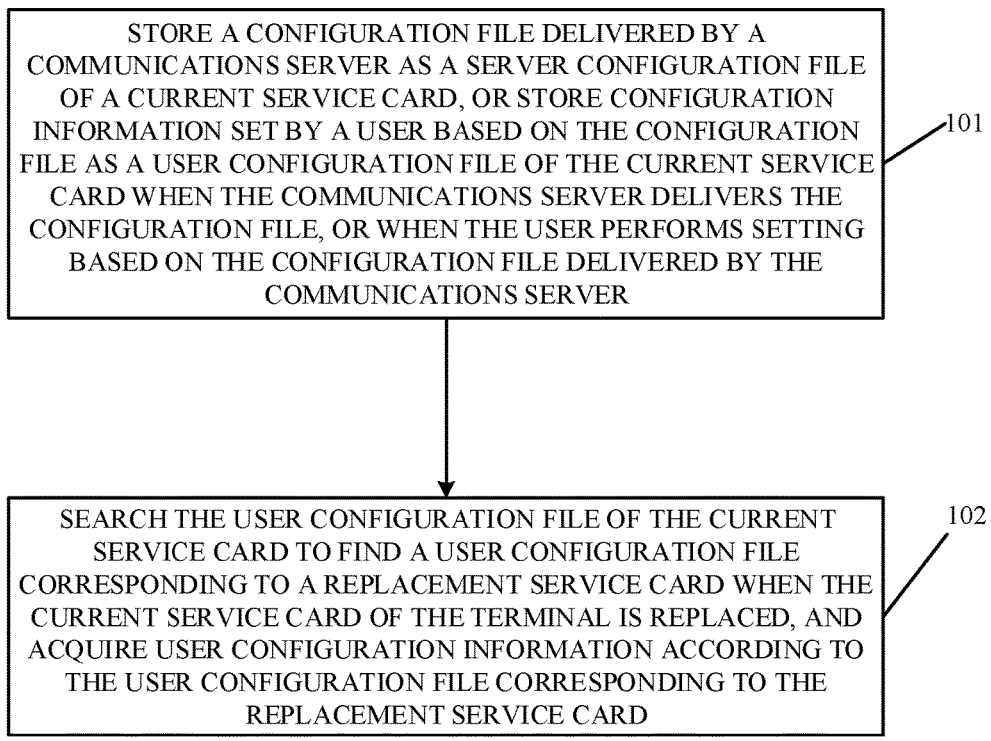
FIG. 1 is a flow chart of a method for acquiring user configuration information according to an implementation 1 of the present disclosure.

FIG. 1 is a flow chart of a method for acquiring user configuration information according to the implementation 1 of the present disclosure. Preferably, a communications system involved in the method is a rich communication suite (RCS). As shown in FIG. 1, the method includes the following steps.

Step 101, when a communications server delivers a configuration file, or when a user performs setting based on the configuration file delivered by the communications server, the configuration file delivered by the communications server is stored as a server configuration file of a current service card, or configuration information set by the user based on the configuration file is stored as a user configuration file of the current service card.

There is at least one server configuration file of the current service card or at least one user configuration file of the current service card.

In step 101, the configuration information set by the user based on the configuration file delivered by the communications server is configuration information set by a terminal user based on a communications service that is used by a terminal having a service card. That is, the configuration information corresponds to the current service card of the terminal. Furthermore, the configuration information may correspond to the international mobile subscriber identification (IMSI) number of the service card of the user. The information may include information that is about whether to use some service functions and that is set by the user according to the current communications service. Preferably, the user configuration file includes user configuration information of different wireless network access points that corresponds to a same IMSI, and user configuration information corresponding to different IMSIs. When being stored, the corresponding user configuration information is stored by using the IMSI as a keyword, to facilitate future searches.

In step 101, the user configuration file is used to store only user configuration information, that is, the user configuration file and the configuration file that is delivered by the server are stored independently, so that the user configuration file is not cleared when a wireless network access point or a service card of the terminal is changed.

Step 102, when the service card of the terminal is replaced, the user configuration file of the current service card is searched to find a user configuration file corresponding to a replacement service card, and user configuration information is acquired according to the user configuration file corresponding to the replacement service card.

In step 102, during the search for the user configuration information, the user configuration file is searched specifically by using the IMSI of the current service card of the terminal as a keyword. That is, when a new service card is inserted into the terminal and the service card is used to perform a communications service, or when a wireless network access point of the terminal is changed, or a wireless network connection manner of the terminal is changed, the user configuration file stored in advance may be searched, according to the IMSI of the service card, for user configuration information corresponding to the corresponding new service card or for user configuration information corresponding to a replacement wireless network access point, provided that the terminal has used the service card and the wireless access point before. If the terminal uses the replacement service card or wireless network access point for the first time, the terminal needs to create a new user configuration file to store corresponding user configuration information. Therefore, the foregoing method further includes: when the user configuration file corresponding to the replacement service card is not found in the user configuration file of the current service card, generating a server configuration file of the replacement service card according to a preset server configuration file template, and generating a user configuration file of the replacement service card according to a preset user configuration file template, where the user configuration file includes configuration information set by the user based on the configuration file delivered by the communications server, and the server configuration file is a configuration file delivered by the communications server to the terminal.

To make it convenient for the user to set configuration information according to a current communications service of the terminal, the user configuration file template is displayed as a general configuration user interface on a terminal interface. The user can set configuration information in the interface. The user configuration file template may be an extensible markup language (XML) file. On this basis, the user configuration file is an XML file named by using the IMSI number of the current service card of the terminal and a user identity, and the server configuration file is an XML file named by using the IMSI number of the current service card of the terminal and a server identity. In this way, when needing to acquire user configuration information, the terminal can quickly find corresponding configuration information according to a file name, thereby improving efficiency of the terminal in acquiring user configuration information. The user identity may be an identity that enables the terminal to identify, according to a file name, that a configuration file is a user configuration file. For example, a keyword such as "User" or "Subscriber" may be used as the user identity. Similarly, the server identity may be an identity that enables the terminal to identify, according to a file name, that a configuration file is a configuration file delivered by the server. For example, a keyword such as "AS" or "server" may be used as the server identity.

Implementation 2

An implementation principle of this implementation is the same as that of the implementation 1. In this implementation, an RCS system is used as an example. More technical details are disclosed to further describe in detail a method for acquiring user configuration information according to the present disclosure. It should be noted that, this implementation is merely a preferred implementation and does not uniquely limit the present disclosure.

A user configuration file template (User Profile.XML) is provided to a terminal. Two configuration files are provided to each RCS service card, which are a user configuration file and a configuration file that is delivered by a server. The user configuration file includes configuration information based on a wireless network access point and WiFi, and is used to store configurations (for example, whether to use a file transmission function and whether to allow file transmission, and so on) that are based on different access points when a user uses different service cards on the terminal. In addition, a naming rule of the user configuration file is User+IMSI+.xml, and a naming rule of the configuration file that is delivered by the server is AS+IMSI+.xml. The IMSI number is the IMSI number of a service card, and is used by the terminal to distinguish between the configuration file delivered by the server and the user configuration file.

The user configuration file template is displayed as a general configuration user interface (UI) on a user interface of the terminal. The user may set an RCS using habit in the UI.

After a new service card is inserted into the terminal, a configuration directory is searched, according to the IMSI number of the service card, for a corresponding configuration file. If there is no corresponding configuration file, the foregoing two files are generated, that is, the user configuration file and the server configuration file. Specifically, the user configuration file User+IMSI+.xml is generated according to the user configuration file template (UserProfile.XML). A configuration change set by the user is stored in the file, and the configuration file delivered by the server is stored as AS+IMSI+.xml. If the corresponding configuration file is found in the configuration directory, the found configuration file is used.

User+IMSI+.xml and AS+IMSI+.xml are displayed in an RCS configuration UI of the service card.

A rule for display in the user interface is as follows: a function set by the user to be disabled is displayed as being in a closed state, and a function set by the user to be enabled is displayed in the UI according to the configuration file delivered by the server.

Implementation 3

Figure 2:
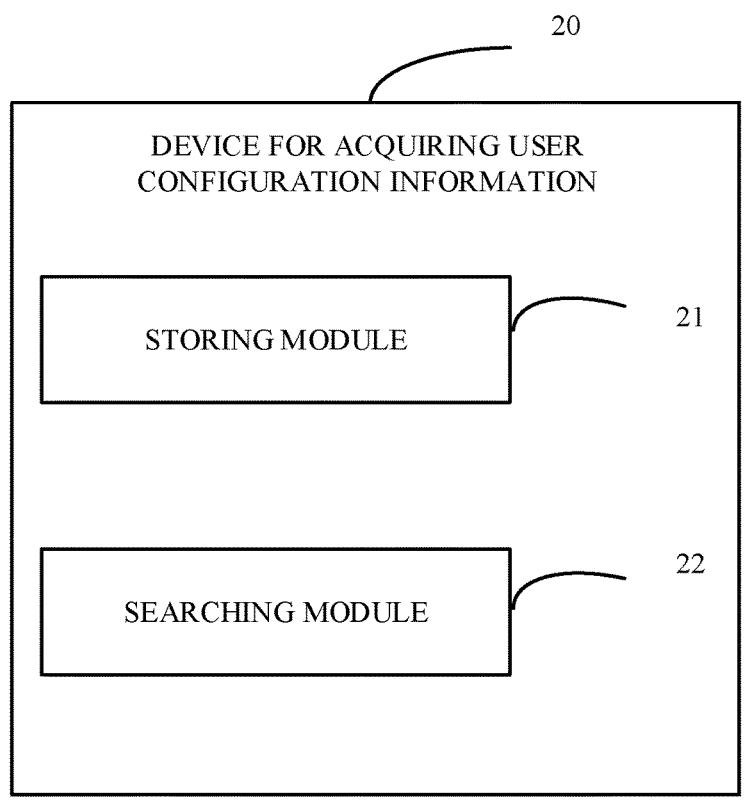
FIG. 2 is a structural block diagram of a device for acquiring user configuration information according to an implementation 3 of the present disclosure.

FIG. 2 is a structural block diagram of a device for acquiring user configuration information according to the implementation 3 of the present disclosure. Preferably, the device may be used in an RCS service. The device is configured to execute the foregoing method for acquiring user configuration information. As shown in FIG. 2, the device 20 may specifically include the following constituent parts.

A storing module 21 is configured to store a configuration file delivered by a communications server as a server configuration file of a current service card or store configuration information set by a user based on the configuration file as the user configuration file of the current service card when the communications server delivers the configuration file or when the user performs setting based on the configuration file delivered by the communications server, where there is at least one server configuration file of the current service card or at least one user configuration file of the current service card.

A searching module 22 is configured to search the user configuration file of the current service card for a user configuration file corresponding to a replacement service card when the service card of a terminal is replaced, and acquire user configuration information according to the user configuration file corresponding to the replacement service card.

The user configuration file of the current service card may specifically include user configuration information of different wireless network access points that correspond to an IMSI number.

Furthermore, the foregoing device 20 may further include a generating module configured to generate a server configuration file of the replacement service card according to a preset server configuration file template and generate a user configuration file of the replacement service card according to a preset user configuration file template when the user configuration file corresponding to the replacement service card is not found in the user configuration file of the current service card.

The user configuration file template is displayed as a general configuration user interface on a terminal interface.

The user configuration file is an XML file named by using the IMSI number of the current service card of the terminal and a user identity, and the server configuration file is an XML file named by using the IMSI number of the current service card of the terminal and a server identity.

According to the technical solution of the present disclosure, the configuration information generated by setting the configuration file delivered by the communications server is stored in the user configuration file of the current service card. When the configuration information needs to be used after a service card is replaced, the configuration information corresponding to the replacement service card is acquired from multiple user configuration files. In comparison with the prior art, the user does not need to reset configuration information after the service card is replaced, facilitating user operations.

Figure 3:
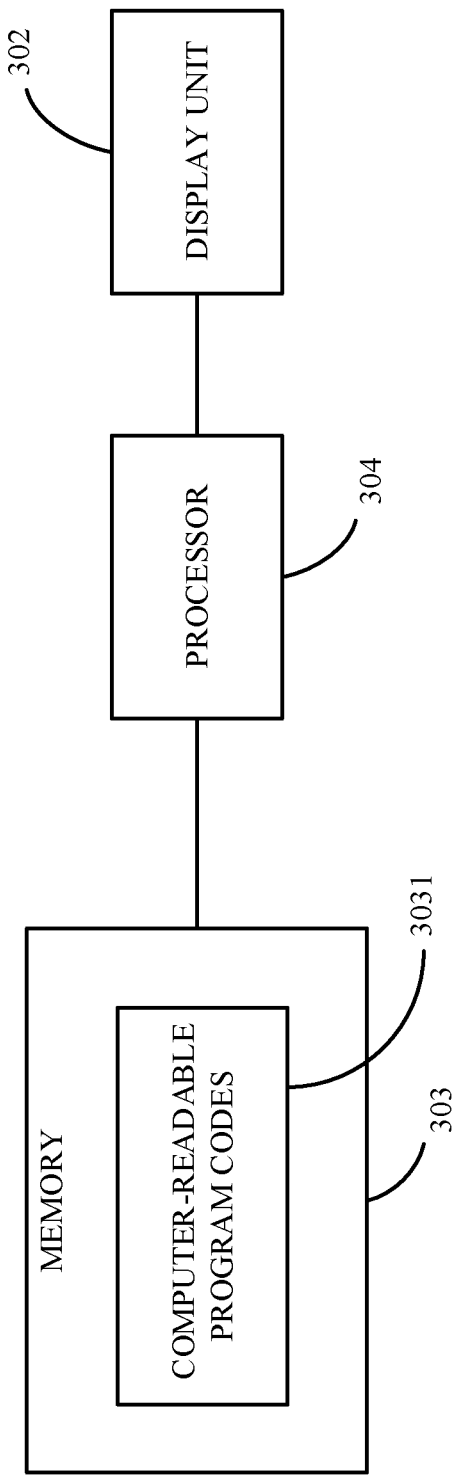
FIG. 3 is a structural block diagram of a terminal according to an implementation of the present disclosure.

FIG. 3 is a structural block diagram of a terminal according to an implementation of the present disclosure. The terminal may include but not limited to a display unit 302, a memory 303, and a processor 304. The display unit 302 and the memory 303 are electrically coupled to the processor 304.

The display unit 302 may be configured to display visual information, such as text, image, for example. The display unit 302 may be a light emitting diode (LED) display screen or an organic light emitting diode (OLED) display screen.

The memory 303 may be configured to store computer-readable program codes 3031. The memory 303 may be a read only memory (ROM), a random access memory (RAM), a U-disk, a removable hard disk, etc.

The processor 304 may include multiple cores for multi-thread or parallel processing. In this implementation, the processor 304 may be configured to execute the computer-readable program codes 3031 to perform following operations: storing a configuration file delivered by a communications server as a server configuration file of a current service card, or storing configuration information set by a user based on the configuration file as a user configuration file of the current service card when the communications server delivers the configuration file, or when the user performs setting based on the configuration file delivered by the communications server, at least one server configuration file of the current service card or at least one user configuration file of the current service card being included; and searching the user configuration file of the current service card to find a user configuration file corresponding to a replacement service card when the current service card of the terminal is replaced, and acquiring user configuration information according to the user configuration file corresponding to the replacement service card.

In at least one alternative implementation, the user configuration file of the current service card may include user configuration information of different wireless network access points that correspond to an IMSI number.

In at least one alternative implementation, the processor may be further configured to invoke the computer-readable program codes to perform following operations: generating a server configuration file of the replacement service card according to a preset server configuration file template, and generating a user configuration file of the replacement service card according to a preset user configuration file template when the user configuration file corresponding to the replacement service card is not found in the user configuration file of the current service card.

In at least one alternative implementation, the user configuration file template is displayed as a general configuration user interface on a terminal interface.

In at least one alternative implementation, the user configuration file is an XML file named by using the IMSI number of the current service card of the terminal and a user identity, and the server configuration file is an XML file named by using the IMSI number of the current service card of the terminal and a server identity.

In the present disclosure, a machine-readable storage medium is further provided. The storage medium may include computer readable program codes. The computer readable program codes are run in a terminal to execute the method for acquiring user configuration information described above, which will not be specifically described to avoid repetition.

Although preferred implementations of the present disclosure are disclosed for an illustrative purpose, a person skilled in the art will be aware that various improvements, additions, and replacements may also be performed. Therefore, the scope of the present disclosure should not be limited to the foregoing implementations.

What is claimed is:

1. A method for acquiring user configuration information, comprising:
    storing a configuration file as a server configuration file of a current service card in response to receiving the configuration file from a communications server, or storing configuration information as a user configuration file of the current service card in response to the configuration information being set based on the configuration file, wherein at least one of the server configuration file of the current service card and the user configuration file of the current service card exists, and wherein the user configuration file of the current service card comprises an extended markup language (XML) file named using an international mobile subscriber identification (IMSI) number of the current service card of a terminal and a user identity, and the server configuration file of the current service card comprises an XML file named using the IMSI number of the current service card of the terminal and a server identity; and
    based on a determination that the current service card of the terminal is replaced with a replacement service card, searching prestored user configuration files to find a user configuration file corresponding to the replacement service card, and acquiring user configuration information to perform a communications service according to the user configuration file corresponding to the replacement service card.

2. The method of claim 1, wherein the user configuration file of the current service card comprises at least one of user configuration information of different wireless network access points corresponding to a same IMSI number, and user configuration information corresponding to different IMSI numbers.

3. The method of claim 1, further comprising:
    based on a determination that the user configuration file corresponding to the replacement service card is not found in the prestored user configuration files, generating a server configuration file of the replacement service card according to a preset server configuration file template, and generating a user configuration file of the replacement service card according to a preset user configuration file template.

4. The method of claim 1, further comprising:
    displaying a user configuration file template as a general configuration user interface on a terminal interface for setting the configuration information.

5. The method of claim 1, further comprising:
    based on a determination that a terminal having the current service card uses a replacement wireless network access point, searching the prestored user configuration files to find a user configuration file corresponding to the replacement wireless network access point, and acquiring user configuration information according to the user configuration file corresponding to the replacement wireless network access point, wherein the terminal has previously used the replacement wireless network access point.

6. An apparatus, comprising:
    a memory configured to store computer-readable program codes; and
    a processor configured to invoke the computer-readable program codes to:
    store a configuration file as a server configuration file of a current service card in response to receiving the configuration file from a communications server, or store configuration information as a user configuration file of the current service card in response to the configuration information being set based on the configuration file, wherein at least one of the server configuration file of the current service card and the user configuration file of the current service card exists, and wherein the user configuration file of the current service card comprises an extended markup language (XML) file named using an international mobile subscriber identification (IMSI) number of the current service card of the apparatus and a user identity, and the server configuration file of the current service card comprises an XML file named using the IMSI number of the current service card of the apparatus and a server identity; and
    based on a determination that the current service card of the apparatus is replaced with a replacement service card, search prestored user configuration files to find a user configuration file corresponding to the replacement service card, and acquire user configuration information to perform a communications service according to the user configuration file corresponding to the replacement service card.

7. The apparatus of claim 6, wherein the user configuration file of the current service card comprises at least one of user configuration information of different wireless network access points corresponding to a same IMSI number, and user configuration information corresponding to different IMSI numbers.

8. The apparatus of claim 6, wherein the processor is further configured to invoke the computer-readable program codes to:
based on a determination that the user configuration file corresponding to the replacement service card is not found in the prestored user configuration files, generate a server configuration file of the replacement service card according to a preset server configuration file template, and generate a user configuration file of the replacement service card according to a preset user configuration file template.

9. The apparatus of claim 6, wherein the processor is further configured to invoke the computer-readable program codes to:
display a user configuration file template as a general configuration user interface on the apparatus interface for setting the configuration information.

10. The apparatus of claim 6, wherein the processor is further configured to invoke the computer-readable program codes to:
based on a determination that the apparatus having the current service card uses a replacement wireless network access point, search the prestored user configuration files to find a user configuration file corresponding to the replacement wireless network access point, and acquire user configuration information according to the user configuration file corresponding to the replacement wireless network access point, wherein the apparatus has previously used the replacement wireless network access point.

11. A non-transitory machine-readable storage medium storing computer-readable program codes, the computer-readable program codes being invoked by a rich communication suite (RCS) terminal to:
store a configuration file as a server configuration file of a current service card in response to receiving the configuration file from a communications server, or store configuration information as a user configuration file of the current service card in response to the configuration information being set based on the configuration file, wherein at least one of the server configuration file of the current service card and the user configuration file of the current service card exists, and wherein the user configuration file of the current service card comprises an extended markup language (XML) file named using an international mobile subscriber identification (IMSI) number of the current service card of the RCS terminal and a user identity, and the server configuration file of the current service card comprises an XML file named using the IMSI number of the current service card of the RCS terminal and a server identity; and based on a determination that the current service card of the RCS terminal is replaced with a replacement service card, search prestored user configuration files to find a user configuration file corresponding to the replacement service card, and acquire user configuration information to perform a communications service according to the user configuration file corresponding to the replacement service card.

12. The non-transitory machine-readable storage medium of claim 11, wherein the user configuration file of the current service card comprises at least one of user configuration information of different wireless network access points corresponding to a same IMSI number, and user configuration information corresponding to different IMSI numbers.

13. The non-transitory machine-readable storage medium of claim 11, wherein the computer-readable program codes being further invoked by the RCS terminal to:
based on a determination that the user configuration file corresponding to the replacement service card is not found in the prestored user configuration files, generate a server configuration file of the replacement service card according to a preset server configuration file template, and generate a user configuration file of the replacement service card according to a preset user configuration file template.

14. The non-transitory machine-readable storage medium of claim 11, wherein the computer-readable program codes being further invoked by the RCS terminal to:
display a user configuration file template as a general configuration user interface on the RCS terminal interface for setting the configuration information.

15. The non-transitory machine-readable storage medium of claim 11, wherein the computer-readable program codes being further invoked by the RCS terminal to:
based on a determination that the RCS terminal having the current service card uses a replacement wireless network access point, search the prestored user configuration files to find a user configuration file corresponding to the replacement wireless network access point, and acquire user configuration information according to the user configuration file corresponding to the replacement wireless network access point, wherein the RCS terminal has previously used the replacement wireless network access point.

* * * * *